United States Patent [19]

Mirabel et al.

[11] 4,260,388

[45] Apr. 7, 1981

[54] PURIFICATION OF ANTHOCYAN SOLUTIONS

[75] Inventors: Bernard Mirabel, Fresnes; Francois Meiller, Palaiseau, both of France

[73] Assignee: Rhone-Poulenc Industries, Paris, France

[21] Appl. No.: 870,856

[22] Filed: Jan. 19, 1978

[30] Foreign Application Priority Data

Jan. 24, 1977 [FR] France .................. 77 01890

[51] Int. Cl.² ........................................... C09B 61/00
[52] U.S. Cl. ................................................ 8/646; 8/53; 8/440; 426/250; 8/438; 8/439
[58] Field of Search .................... 8/80, 81, 53

[56] References Cited

U.S. PATENT DOCUMENTS

| 1,303,426 | 5/1919 | Wall | 8/81 |
| 1,337,673 | 4/1920 | Wall | 8/81 |
| 4,082,660 | 4/1978 | Papirer et al. | 210/36 |

FOREIGN PATENT DOCUMENTS

| 715809 | 10/1968 | Belgium. |
| 2355000 | 5/1974 | Fed. Rep. of Germany. |
| 1291155 | 3/1962 | France. |
| 2299385 | 10/1976 | France. |

*Primary Examiner*—A. Lionel Clingman
*Attorney, Agent, or Firm*—Burns, Doane, Swecker & Mathis

[57] ABSTRACT

Aqueous solutions of anthocyans are purified by contacting same with a particular, metallic oxide adsorbent, said adsorbent being coated with a thin film of a styrene polymer, and thence by separating the adsorbent and treating it with an eluant. The eluate and the dry, powdery anthocyans which can be obtained therefrom are useful red, blue and violet industrial colorants, especially food colorants.

23 Claims, No Drawings

PURIFICATION OF ANTHOCYAN SOLUTIONS

BACKGROUND OF THE INVENTION

1. Field of the Invention

This invention relates to the purification of anthocyans, and, more especially, relates to the purification of aqueous solutions of anthocyans by contacting same with a certain, polystyrene coated metal oxide adsorbent, and thence by separating the adsorbent and treating it with an eluant.

2. Description of the Prior Art

Anthocyans are natural red, blue and violet food colorants which cannot be obtained in powder form from their solutions of extraction because of the impurities contained in such solutions. In order to purify these solutions, it has to date been proposed to treat the aqueous solutions of extraction with adsorbents such as talc, which adsorbents adsorb the anthocyans, which are then subsequently eluted with an aqueous solution of sulfur dioxide or alcohol. However, talc has but slight capacity for such adsorption and, therefore, it is necessary to use large amounts of the talc; moreover, it is difficult to separate talc from aqueous suspensions thereof and any continuous separation technique is virtually impossible due to the low granulometry of the talc.

It has also been proposed to adsorb anthocyans on various anion exchangers, but such adsorption lacks selectivity and subsequent elution must be performed at a pH which is harmful to the quality of the resultant desired product.

SUMMARY OF THE INVENTION

Accordingly, a primary object of the present invention is to provide for the improved purification of anthocyan solutions.

Another object of this invention is to provide for the facile adsorption and subsequent elution of anthocyans utilizing improved adsorbents.

Yet another object of the invention is to provide for the improved, selective adsorption of anthocyans, utilizing an adsorbent of improved granulometry.

Still another object of the invention is the utilization of improved selective adsorbents which concomitantly permit of easy separation, lend themselves to a continuous operation, and which are readily treated with an eluant to yield high purity eluates.

Another object of the invention is the provision of high purity eluates which are easily converted into dry, storage-stable, non-hygroscopic powders.

Briefly according to the invention, the foregoing and other objects are attained by contacting an aqueous solution of anthocyans with an adsorbent thence by treating said adsorbent with an eluant; the subject purification is characterized by the fact that the adsorbent comprises a metallic oxide with a surface coating of a styrene polymer film.

DETAILED DESCRIPTION OF THE INVENTION

The aqueous anthocyan solutions are well known and typically comprise a mixture of water, sugars, pectins, gums, organic acids, polyphenols, the major component of which being the anthocyans, mineral and nitrogenous substances. These solutions are present in the form of more or less viscous liquids, with their respective colors being a function of pH. The solutions are obtained in known manner, for example, by the extraction of the residuum of grape making with hot water, or with an aqueous solution of sulfur dioxide, followed by aging, centrifuging and in certain instances by concentration; same also directly result from the residue of the distillation of alcohol from red wines.

Representative of the metallic oxides comprising the adsorbents utilized according to the invention are titanium oxide, the aluminum oxides and silica. Same typically display granulometries between 50 $\mu$m and 5 mm; their adsorption capacity increasing with decreasing particle size. Although it is not absolutely critical, it is preferred that the adsorbent have high pore volumes, generally above of 0.3 ml/g.

By "styrene polymer" as used herein and in the claims which follow, there are intended the homopolymers of styrene and its related derivatives, such as methyl styrene, ethyl styrene, vinyl toluene, and the like; also intended are those copolymers of styrene or derivative thereof with at least one other comonomer copolymerizable therewith, such comonomers being present in the polymer in amounts of up to 30% by weight. Representative of these comonomers, there are mentioned the vinyl monomers, also the acrylic and methacrylic nitriles, e.g., acrylonitrile and methacrylonitrile, alkyl acrylates and methacrylates with the alkyl moieties thereof containing from 1 to 10 carbon atoms, and the dienes such as butadiene and derivatives thereof.

The styrene polymer is advantageously reticulated or cross-linked by including in the polymerization recipe at least one polyfunctional vinyl comonomer, such as the vinyltrialkoxysilanes, the vinyltrihalosilanes, divinylbenzene, divinylether, the mono- or polyethylene glycol diacrylates or dimethacrylates, e.g., ethylene glycol di(meth)acrylate, methylenebisacrylamide, vinylmethacrylate, triallylcyanurate, diallylphthalate, and the like, in amounts between about 0.1 and 30%, preferably between 5 and 10% by weight of the principal monomer or mixture of monomers. The presence of a reticulating monomer or cross-linking agent improves the life of the adsorbent.

The choice of reticulated polymer is a function of the solution to be treated and of the operating conditions, such as, for example, the temperature.

The coating, per se, of the metallic oxide with either the reticulated or non-reticulated styrene polymer can be effected either from the polymer or from the corresponding monomer or monomers.

In the first alternative, the metallic oxide is impregnated with a solvent solution of the polymer, and the solvent then evaporated, thus providing a layer of the polymer on the surface of the metallic oxide.

In the second alternative, the metallic oxide is impregnated with a solvent solution of the styrene monomer or mixture of monomers including the at least one olefinically unsaturated or diene comonomer copolymerizable with the styrene, and in certain instances including the at least one reticulating or cross-linking polyfunctional vinyl monomer and catalyst; such solution then being evaporated and the monomers polymerized and, optionally, reticulated according to techniques well known to the art, such as heating or irradiation.

The catalyst is selected from among the known, organosoluble free-radical catalysts as are conventionally utilized in the polymerization of styrene monomers, and are employed in the usual proportions.

The solvent, which must be inert with respect to the metallic oxides, the monomers and the polymers, preferably has a boiling point as low as possible, to facilitate its evaporation. Exemplary thereof, the following are mentioned as illustrative: methylene chloride, ethyl ether, benzene, xylene, acetone, ethyl acetate, and the like. The solvent is employed in amounts sufficient to dissolve the polymer or the monomer (monomers) and to wholly impregnate the metallic oxide. In most instances, the amount of solvent will be greater than 50% by weight with respect to the metallic oxide.

The anthocyan solutions may be treated discontinuously, by contacting said solutions with the adsorbent at a temperature of 0° to 65° C., for 5 minutes to 2 hours. The adsorbent onto which the anthocyans are sorbed, is separated from the medium by known technique, and then brought into contact with an eluant at a temperature of 0° to 65° C., which may either be the same as or different from the temperature of adsorption, also for 5 minutes to 2 hours. The adsorbent separated from the eluate may be reused in another operation.

The anthocyan solutions may also be treated continuously. In this instance, the solution to be treated is passed, at a temperature of 0° to 65° C., through a column containing the adsorbent, maintained at the same temperature, until the solution exiting the column is colored. The anthocyans sorbed on the adsorbent are then separated by elution with an eluant at a temperature from 0° to 65° C., which temperature may either be the same as or different from that of the solution to be treated, until the effluent from the column is virtually colorless. The column can be reused in another operation.

Regardless of whether the operation is continuous or discontinuous, the amount of adsorbent utilized is a function of the total amount of anthocyans in solution, as evidenced by the color of the solution, and expressed by its optical density (OD). The optical density is the absorption of 1 ml of the solution measured in a 1 cm wide cell, at pH 4 and a wave length of 525 nm. The amount of the adsorbent is between 0.4 and 10 g per 100 OD.

The concentration of the anthocyan solution is not an important factor in the subject process. It is, however, preferable for reasons of economy that the solutions to be treated be neither too dilute nor excessively viscous.

The pH of the anthocyan solution similarly has no effect on the adsorption according to the invention.

Any solvent for the anthocyans, whether dilute or not, may be used as the eluant, therefor, e.g., acetone, dimethylformamide, lower alcohols, and preferably alcoholic solutions containing up to 70% by weight lower alkanols. The alkanols utilized most preferably have a number of carbon atoms equal to or less than 4.

The pH value has no effect on the eluant activity of the alcoholic solution.

The resultant solutions of anthocyans can be used as such, or in a more concentrated solution form, or same can be separated from solution by any classical drying process yielding a powder, such as, for example, vacuum distillation, followed by lyophilization or atomizing. The anthocyan solutions and powders obtained are utilized as red, blue or violet industrial colorants, depending on pH, and find especial use as food colorants, such as dairy, confectionary, bakery, meat and beverage product colorants. The separated anthocyans are in the form of a dry powder; they are black in color, non-hygroscopic and stable over time.

In order to further illustrate the present invention and the advantages thereof, the following specific examples are given, it being understood that the same are intended only as illustrative and in nowise limitative.

EXAMPLE 1

Forty g of silica having a granulometry of 100 to 200 $\mu$m and a pore volume of 1 ml/g were dried at 150° C. under reduced pressure for 5 hours.

The dry silica thus obtained was suspended in 150 ml of methylene chloride containing 3 g polystyrene in solution.

The methylene chloride was evaporated in vacuum at ambient temperature, and then the resultant silica coated with the polystyrene was passed through a 100–200 $\mu$m screen to eliminate polystyrene particles not adhering to the silica.

Analysis revealed a carbon content of 3% by weight with respect to the coated silica.

One g of the silica obtained was suspended in 35 ml of an aqueous solution of anthocyans, having a coloration, expressed in optical density (OD), at a wave length of 525 nm and pH 4, of 63 and an amount of dry extract of 152 mg. The silica was maintained in suspension by agitation at ambient temperature, for one hour.

Following the separation of the silica, the coloration and the amount of dry extract of the solution were determined. The difference provides the coloration and the quantity of solids corresponding to the anthocyans adsorbed.

The silica was again suspended in 50 ml of an aqueous solution of ethyl alcohol at 50% by weight, and maintained in suspension with agitation at ambient temperature for one hour.

After separation, the coloration and amount of dry extract of the solution was determined.

For comparison, three experiments were performed as described above, with the same silica without coating (Experiment A), with particles of polystyrene employed to coat the silica of Example 1 (Experiment B), and with porous polystyrene pearls or beads having a pore volume equivalent to that of the silica (Experiment C).

The results are reported in the following Table I:

TABLE I

|  |  | Example 1 | Experiment A | Experiment B | Experiment C |
|---|---|---|---|---|---|
| Solution to be treated | coloration OD | 63 | 63 | 63 | 63 |
|  | dry extract (mg) | 152 | 152 | 152 | 152 |
| Treated solution | coloration OD | 18 | 63 | 63 | 51 |
|  | dry extract (mg) | 147 | 152 | 152 | 147 |
| Product adsorbed | coloration OD | 45 | 0 | 0 | 12 |
|  | dry extract (mg) | 5 | 0 | 0 | 5 |
| Eluate solution | coloration OD | 43 | 0 | 0 | 7 |

TABLE I-continued

|  | Example 1 | Experiment A | Experiment B | Experiment C |
| --- | --- | --- | --- | --- |
| dry extract (mg) | 5 | 0 | 0 | 3 |

EXAMPLE 2

100 g of the silica of Example 1 were dried at 150° C. under reduced pressure for 5 hours.

The dry silica obtained was suspended in a solution formed of 250 ml methylene chloride, 60 ml of distilled styrene, 20 ml vinyltriethoxysilane and 0.5 g azobisisobutyronitrile.

The methylene chloride was evaporated at ambient temperature, then the coated silica was heated at 120° C. for 6 hours, under 3 bar, to effect reticulation.

The silica was then suspended in 300 ml xylene and heated to boiling for 2 hours. After filtration, the silica was washed in acetone and dried.

Analysis revealed a carbon content of 4% by weight with respect to the coated silica.

The silica was used to treat an anthocyan solution as described in Example 1.

For comparison, an anthocyan solution was treated with talc in the same manner (Experiment D) and with an ion exchange resin consisting of silica coated with reticulated polystyrene containing quaternary ammonium groups (Experiment E).

The results are summarized in the following Table II:

TABLE II

|  |  | Example 2 | Experiment D | Experiment E |
| --- | --- | --- | --- | --- |
| Solution to be treated | coloration OD | 63 | 63 | 63 |
|  | dry extract (mg) | 152 | 152 | 152 |
| Treated solution | coloration OD | 9.5 | 44.5 | 9 |
|  | dry extract (mg) | 143 | 146 | 111 |
| Product adsorbed | coloration OD | 53.5 | 18.5 | 54 |
|  | dry extract (mg) | 9 | 6 | 41 |
| Eluate solution | coloration OD | 50 | 18 | 7 |
|  | dry extract (mg) | 8.5 | 5 | 4.5 |

Examination of the above Table reflects that:

(a) Compared to the adsorbent of the invention, talc is less adsorbent and less selective, i.e., it preferentially adsorbs products other than the anthocyans. In addition, separation of the talc from the solutions is very difficult.

(b) The ion exchanger adsorbs well, but it is poorly selective and the elution of the sorbed products is quite poor.

If in Experiment E the elution is performed with 50 ml of a 50% by weight ethanol solution in N/10 hydrochloric acid, an eluate with a coloration of 41 OD and 30 mg extract are obtained. The elution of sorbed product is better than in Experiment E, but worse than that of Example 2, but selectivity remains very inferior to that of Example 2.

The same elution as herein before in Example 2 does not modify the results. However, the use of an acid solution is not recommended, without regard to the adsorbent used.

EXAMPLE 3

Example 2 was repeated, but the dry silica was treated with 200 ml methylene chloride containing, in solution, 7 ml styrene, 0.7 ml divinylbenzene and 0.1 g azobisisobutyronitrile.

Following evaporation, the coated silica was heated to 80° C. for 6 hours at atmospheric pressure, to effect polymerization. Same was then washed in acetone and dried. The carbon content was 5.8% by weight with respect to the coated silica.

Treatment of the anthocyan solution provided the following Table III results:

TABLE III

| Solution to be treated | coloration (OD) | 63 |
| --- | --- | --- |
|  | dry extract (mg) | 152 |
| Treated solution | coloration (OD) | 11 |
|  | dry extract (mg) | 146 |
| Adsorbed product | coloration (OD) | 52 |
|  | dry extract (mg) | 6 |
| Eluate solution | coloration (OD) | 48 |
|  | dry extract (mg) | 6 |

EXAMPLE 4

A column having a 10 cm diameter, filled with 4.5 kg of the coated silica of Example 3 was used; 5 l distilled water were percolated through the column.

The following operations were successively performed:

Percolation, in one hour, of 7 l of the anthocyan solution to be treated.

Washing of the column with 8 l distilled water at a rate of 20 l/h.

Elution of the sorbed products with 15 l of an aqueous solution of ethyl alcohol, 50% by weight, at a rate of 8 l/h.

Percolation of 5 l of distilled water at a rate of 8 l/h.

Coloration and dry extract measurements provided the following Table IV results:

TABLE IV

| Solution to be treated | coloration (OD) | 595.000 |
| --- | --- | --- |
|  | dry extract (g) | 1.660 |
| Solution treated | coloration (OD) | 115.000 |
|  | dry extract (g) | 1.520 |
| Products adsorbed | coloration (OD) | 480.000 |
|  | dry extract (g) | 140 |
| Eluate (the anthocyans are extracted with 7 l of an alcoholic solution) | coloration (OD) | 480.000 |
|  | dry extract (g) | 140 |
|  | anthocyan concentration (g/l) | 20 |

The different successive operations were repeated 9 times. Results were essentially the same as those reflected above.

The eluate of one of the series of operations was concentrated in vacuum to a volume of 2 liters, then lyophilized. A fine, dry, black powder with a mass of 135 g was obtained; it was stable over time.

EXAMPLE 5

One liter of red wine was concentrated in vacuum to a volume of 0.5 liter. The concentrate had a coloration of 1500 OD.

Thirty g of the adsorbent of Example 3 were suspended in the concentrate and maintained in suspension by agitation, at ambient temperature, for one hour.

After separation of the adsorbent, the amount of anthocyans adsorbed corresponded to a coloration of 1050 OD.

The adsorbent was then suspended in 0.5 liter of a 50% by weight aqueous solution of ethanol and maintained in suspension with agitation, at ambient temperature, for one hour.

Following the separation of the adsorbent, the eluate evidenced a coloration of 1000 OD and an amount of dry extract of 400 mg.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A method for the purification of an aqueous anthocyan solution, which comprises contacting such solution with a particulate adsorbent selected from the group consisting of silica and metallic oxide adsorbents having a granulometry of between about 50 m$\mu$ and 5 mm, said adsorbent being coated with a thin film of a styrene polymer, and thence separating the adsorbent and treating it with an eluant.

2. The method as defined by claim 1, wherein the styrene polymer is a homopolymer of a monomer selected from the group consisting of styrene, methyl styrene, ethyl styrene and vinyl toluene.

3. The method as defined by claim 2, wherein the styrene polymer is homopolystyrene.

4. The method as defined by claim 1, wherein the styrene polymer is reticulated.

5. The method as defined by claim 1, wherein the styrene polymer is a copolymer of a styrene monomer and up to 30% by weight of an ethylenically unsaturated or diene comonomer copolymerizable therewith.

6. The method as defined by claim 5, wherein the styrene copolymer is reticulated.

7. The method as defined by claim 1, wherein the metallic oxide is selected from the group consisting of titanium oxide and aluminum oxide.

8. The method as defined by claim 1, wherein the adsorbent has a pore volume greater than about 0.3 ml/g.

9. The method as defined by claim 1, wherein the adsorbent is prepared by impregnating the metallic oxide or silica with a solvent solution of the styrene polymer and thence evaporating the solvent to dryness.

10. The method as defined by claim 1, wherein the adsorbent is prepared by impregnating the metallic oxide or silica with a solvent solution of the monomers comprising the styrene monomer and thence evaporating the solvent to dryness and in situ polymerizing the said monomers.

11. The method as defined by claim 10, the solvent solution further comprising a polymerization catalyst.

12. The method as defined by claim 9, wherein the solvent is selected from the group consisting of methylene chloride, ethyl ether, benzene, xylene, acetone and ethyl acetate, and is present in an amount greater than 50% by weight with respect to the metallic oxide or silica.

13. The method as defined by claim 10, wherein the solvent is selected from the group consisting of methylene chloride, ethyl ether, benzene, xylene, acetone and ethyl acetate, and is present in an amount greater than 50% by weight with respect to the metallic oxide or silica.

14. The method as defined by claim 1, characterized in that the same is conducted continuously.

15. The method as defined by claim 1, characterized in that the same is conducted discontinuously.

16. The method as defined by claim 1, wherein the contacting with the adsorbent is at a temperature of from 0° to 65° C., for a period of from 5 minutes to 2 hours.

17. The method as defined by claim 16, wherein the elution is at a temperature of from 0° to 65° C.

18. The method as defined by claim 1, wherein the elution is with a lower alkanol solution.

19. The method as defined by claim 1, wherein the amount of adsorbent utilized is between 0.4 and 10 grams per 100 OD.

20. The method as defined by claim 1, further comprising drying the resulting eluate to dryness.

21. The method as defined by claim 1, further comprising powdering the resulting eluate.

22. The method as defined by claim 4, wherein the styrene polymer is reticulated by at least one cross-linking vinyl monomer making up 0.1 to 30% by weight of the monomer(s).

23. The method as defined by claim 22, wherein the styrene polymer is reticulated by at least one cross-linking vinyl monomer making up 5 to 10% by weight of the monomer(s).

* * * * *